United States Patent
Easwar et al.

(10) Patent No.: US 7,783,713 B2
(45) Date of Patent: Aug. 24, 2010

(54) METHOD AND APPARATUS FOR RESPONSE ENABLED MESSAGING

(75) Inventors: Venkat Easwar, Los Gatos, CA (US);
Partha Chowdhury, Fremont, CA (US);
Chirag Bakshi, San Jose, CA (US);
Amit Agarwal, Fremont, CA (US)

(73) Assignee: Syniverse ICX Corporation, Tampa, FL (US)

( * ) Notice: Subject to any disclaimer, the term of this patent is extended or adjusted under 35 U.S.C. 154(b) by 180 days.

(21) Appl. No.: 11/876,717

(22) Filed: Oct. 22, 2007

(65) Prior Publication Data

US 2009/0106374 A1   Apr. 23, 2009

Related U.S. Application Data

(60) Provisional application No. 60/853,088, filed on Oct. 20, 2006.

(51) Int. Cl.
*G06F 15/16* (2006.01)
(52) U.S. Cl. .................. 709/206; 709/203; 709/223
(58) Field of Classification Search .............. 709/203, 709/206, 219, 200, 3, 223.2
See application file for complete search history.

(56) References Cited

U.S. PATENT DOCUMENTS

| | | | |
|---|---|---|---|
| 5,758,088 A | 5/1998 | Bezaire et al. | |
| 6,611,814 B1 | 8/2003 | Lee et al. | |
| 6,771,801 B1 | 8/2004 | Fisher et al. | |
| 6,848,000 B1 | 1/2005 | Reynolds | |
| 6,920,487 B2 | 7/2005 | Sofer et al. | |
| 7,111,044 B2 | 9/2006 | Lee | |
| 7,206,647 B2 | 4/2007 | Kumar | |
| 7,302,402 B2 | 11/2007 | Callaghan et al. | |
| 7,302,480 B2 | 11/2007 | Lahtinen | |
| 7,421,730 B2 | 9/2008 | Walther et al. | |
| 7,460,873 B2 * | 12/2008 | Lovell et al. | 455/466 |
| 2002/0052921 A1 | 5/2002 | Morkel | |
| 2002/0091843 A1 | 7/2002 | Vaid | |
| 2002/0133545 A1 | 9/2002 | Fano et al. | |
| 2003/0018726 A1 | 1/2003 | Low et al. | |
| 2003/0065738 A1 | 4/2003 | Yang et al. | |
| 2004/0043770 A1 | 3/2004 | Amit et al. | |
| 2004/0186889 A1 * | 9/2004 | Washburn | 709/206 |
| 2005/0071419 A1 | 3/2005 | Lewontin | |
| 2008/0039048 A1 * | 2/2008 | Turri et al. | 455/404.1 |
| 2008/0304506 A1 * | 12/2008 | Becker et al. | 370/441 |

FOREIGN PATENT DOCUMENTS

WO   WO 2004/105405 A2   12/2004

OTHER PUBLICATIONS

PCT/US07/22437, International Search Report and Written Opinion, dated Mar. 14, 2008, 8 pages.
Random House Webster's College Dictionary definition #6 of "server" Random House, New York 1997, p. 1182.

* cited by examiner

*Primary Examiner*—Salad Abdullahi
*Assistant Examiner*—El Hadji M Sall
(74) *Attorney, Agent, or Firm*—Blakely, Sokoloff, Taylor & Zafman, LLP; Judith A. Szepesi

(57) ABSTRACT

A method and apparatus for creating associations between messages in a stateless system. The method comprises adding a unique identification to a notification message at a gateway, and upon receiving a response from a user, identifying the unique identification within the response, and utilizing the unique identification to associate the response with the notification message.

15 Claims, 3 Drawing Sheets

METHOD AND APPARATUS FOR RESPONSE ENABLED MESSAGING

RELATED APPLICATION

The present application claims benefit of U.S. Provisional Patent Application Ser. No. 60/583,088, filed on Oct. 20, 2006.

FIELD OF THE INVENTION

The present invention relates to enabling a messaging system to create an association between a notification message and a corresponding response message.

BACKGROUND

Mobile messaging offers the opportunity of improved productivity for enterprises. Generating mobile notifications from enterprise applications is straightforward. Such notifications allow the end user to be notified in a timely manner regarding important events in an enterprise workflow. For example, employees in a supply chain company can be notified of progress of an item in the order process. Such notices may be sent in various ways, including short messaging system (SMS) messages. However, such notifications do not allow the employee to respond back with actions or directives through the messaging channel.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is response enabled messaging system, which allows a stateless messaging system to associate a notification/original message with a response. A stateless messaging system does not preserve the original message's message ID in a response. Such stateless messaging systems include short messaging system (SMS), multimedia messaging system (MMS), and others. For simplicity, in the below examples, SMS will be used. However, one of skill in the art would understand that the processes described herein would apply to any other stateless messaging system.

The system will automatically associate any response with the original notification. This enables an employee to respond to a notification with directives/actions. In one embodiment, such a directive/action may be automatically processed by a workflow system. This system provides improved productivity since the employee can not only receive notifications when they are mobile, but they can also respond to them immediately.

One use of the response enabled messaging permits an employee receiving a message originated from an enterprise application to respond with one or more keywords that can initiate an action. Furthermore, in one embodiment the system permits a message thread, enabling error messages, clarifications, and other related message exchanges to be maintained together.

In one embodiment, the system may use the ORACLE Enterprise Suite™ and associated applications, or other enterprise applications. In one embodiment, the enterprise application utilizes one or more underlying databases. However, the methodology may be used with any SMS-sending system, and does not require an underlying database or enterprise system.

Some Enterprise Suites generate workflow notifications for end users. These notifications are typically email based. Users receive an email including one or more hyperlinks. Users can then click on hyperlinks for "Accept" "Reject" etc. that typically launch the email client with a pre-populated message template that includes an appropriate keyword (accept, reject, approve, forward, etc.) corresponding to the hyperlink that the user clicked and an ID that identifies the corresponding workflow item. The ID and the keyword from the reply are used to affect the appropriate change to the corresponding workflow item. However, SMS does not provide such a response function. Natively, SMS messages are unconnected to each other. Although you can press "reply" what is generated is an unconnected SMS, directed at the originator of your message. While this may work in a personal messaging environment, where an individual sends and receives only a few messages a day, it does not function well in a corporate environment. An enterprise suite may generate hundreds of messages in a day.

Figure 1:
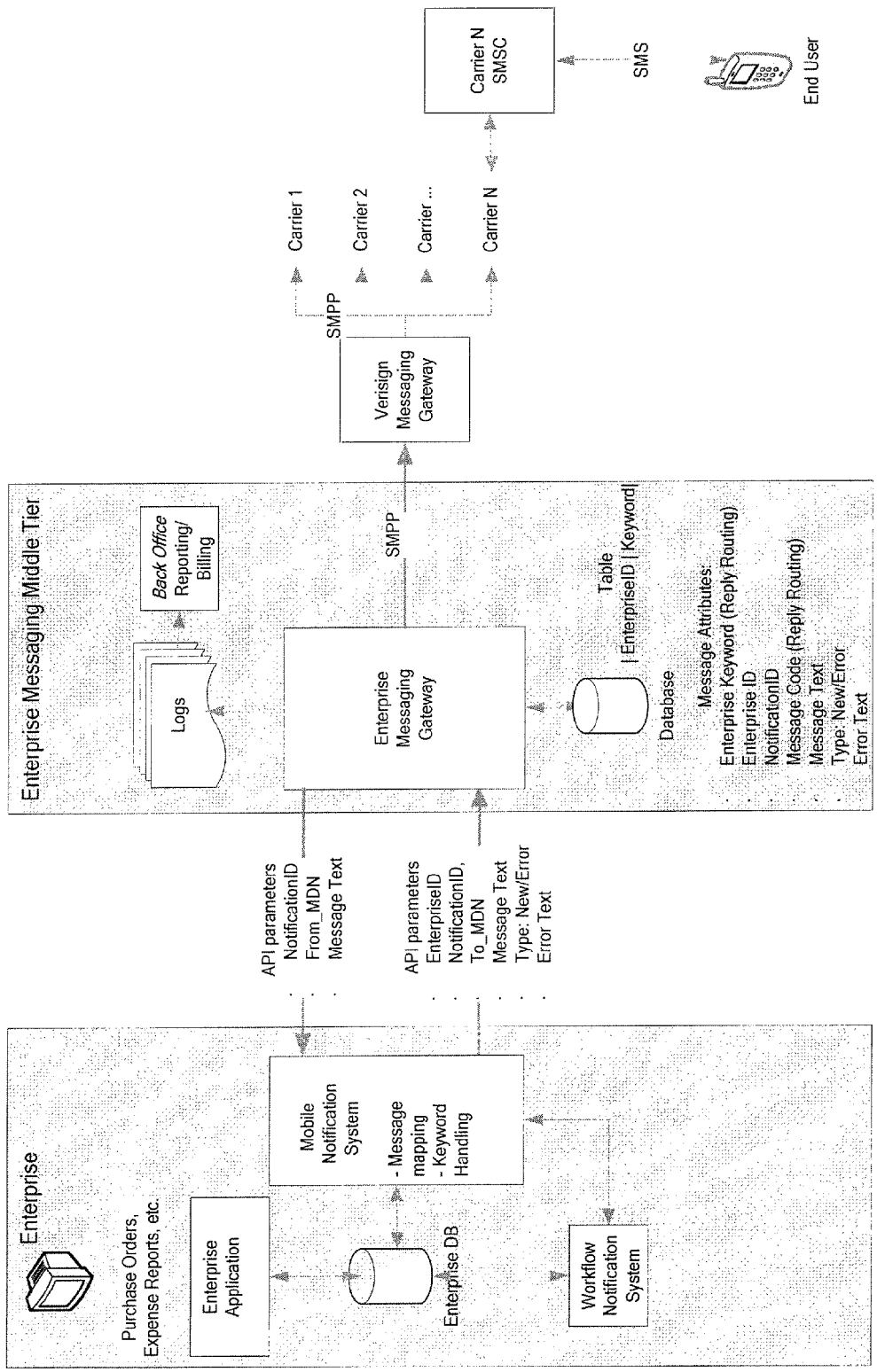
FIG. 1 is a block diagram of one embodiment of the system.

FIG. 1 is a block diagram of one embodiment of the system. The primary components in one embodiment include:

Enterprise Mobile Notification System 110: This system converts the Enterprise workflow notifications to Mobile Notifications and sends them to the Enterprise Messaging Gateway via an API.

Enterprise Messaging Gateway 120: This Gateway manages the scheme to route a reply back to the originating enterprise system element, along with the original NotificationID or an equivalent identifier.

Global Messaging Gateway 130: This Gateway delivers messages globally.

The Enterprise Mobile Notification System (EMNS) 110 may, in one embodiment reside on the enterprise database system. Alternatively, the EMNS 110 may reside on a separate server, but be coupled to the database system. The EMNS 110 maps workflow notifications to mobile notifications (which have constrained length compared to email notifications). In one embodiment, the functionality of the EMNS 110 may be integrated into the enterprise database system. Thus, the EMNS 110 need not be a separate software application from the notification originating system, but is simply logic to enable the notification to be sent via SMS or similar mobile protocol.

In one embodiment, a UI tool enables an authorized user, for example an Enterprise IT manager, to select the appropriate fields in the various types of workflow notifications to assemble into a mobile notification. In one embodiment, the mobile notification may be assembled automatically by the EMNS 110. Typical fields are Subject, Amount to be approved (for Expense Report, Purchase Order, etc), and others. Accepted and expected action keywords (Accept, Reject, etc.) are created for various user actions that are possible for this workflow event.

The workflow system automatically triggers such workflow notifications to be sent. In one embodiment, the EMNS 110 converts the notifications to SMS or another mobile format. The notifications, in one embodiment, are sent via an API (application programming interface) to the Enterprise Messaging Gateway 120. In one embodiment, the components of a mobile notification include:

- NotificationID. This ID is used by the Enterprise Messaging Gateway for the corresponding reply from user.
- Destination Mobile Number
- Message Text (e.g. "Expense Report John Doe Trip to CTIA Conference $1200. Reply Approve or Reject").

The EMNS 110 receives a reply from the Enterprise Messaging gateway 120 with the user-selected action keyword (Approve, Reject, etc.) and the appropriate NotificationID. The EMNS 110 then passes the response data to the enterprise systems to affect the change associated with the keyword. In one embodiment, the EMNS 110 may translate the response into a proper format for the enterprise application.

The Enterprise Messaging Gateway (EMG) 120 is the system that correlates replies with corresponding input messages. This correlation is important since SMS clients on handsets do not preserve any state in a reply.

In one embodiment, the Gateway 120 stores the following information for the input message:

- Enterprise ID: The enterprise making the message delivery request is identified by the corresponding connection point to this system (in one embodiment each Enterprise has a dedicated connection point).
- Enterprise Keyword: is identified for the Enterprise: for example: VRSN for Verisign. In one embodiment, the Enterprise ID can be replaced by the Enterprise Keyword, and vice versa. The Enterprise keyword may be as short as a single letter, if that is all that is needed to uniquely identify the enterprise. Generally, minimizing keyword length is useful because typing on a mobile device may be difficult.
- NotificationID: set by Enterprise for identifying the workflow event.
- Message Keyword: An Alpha-numeric keyword for Message is generated. In one embodiment, the Message Keyword may be a 3 digit keyword.

The Gateway 120, in one embodiment, splits messages larger than the SMS maximum (in one embodiment 160 characters) into multiple messages. In one embodiment, such split messages receive a single NotificationID and Message Keyword.

An SMS or similar stateless originating message, or notification, is generated for the client device. For example, an SMS message is constructed, requesting a response from the user. For example, an exemplary SMS message may read "VRSN Purchase Order #ABC $999 For Some Project Hardware. Reply with VRSN MXY ACCEPT/REJECT." This message has the following components:

- Description of event ("VRSN Purchase Order #ABC $999 For Some Project Hardware")
- Reply Instructions. These instructions may include one or more of the following:
  a. Enterprise Keyword ("VRSN")
  b. Message Keyword ("MXY")—this is used by the Enterprise Messaging Gateway to correlate this reply with originating message.
  c. Action Keywords ("ACCEPT, REJECT").
  d. Short message code A short message code is assigned to the message. The short message code is a part of the SMS specification. Generally, Short Codes are phone numbers that are 5 digits long. These phone numbers are used in SMS messaging instead of long numbers such as 1-206-555-4321, i.e. telephone numbers with area codes. A provider can lease these short codes to a corporation. In one embodiment, the corporation may have a range of short codes (i.e. the codes between 50000 and 51000).

The user is prompted to create a response. The response, in one embodiment, must include all three components prompted for by the instructions Enterprise Keyword, Message Keyword, Action Keyword). In another embodiment, the Enterprise Keyword can be eliminated if an Enterprise uses a dedicated short code (say 55555) so that the reply can be routed back to enterprise based on the dedicated short code that it was sent to. The Enterprise Keyword is only used to distinguish between enterprises on a shared Short Code.

In one embodiment, the Message Keyword can also be eliminated by the Enterprise Messaging Gateway by rotating through a set of short codes, such that the short code of the response is likely to be unique. For example, the system may rotate through 1000 short codes sequentially for a particular destination MDN. The short code is associated with the input message in the database. Therefore, the reply can be correlated back to the originating message. This approach assumes that the user responds to a message in a timely manner. Since very few SMS clients store a large number of messages (older messages are discarded), if the range of available short codes is large enough, there is minimal possibility of conflict.

In one embodiment, this cycle may be repeated. That is, the response sent by the user may trigger an error message, or request for clarification. The EMG 120 would associate this subsequent message with the original notification and response. In one embodiment, the EMG builds a message thread based on communications between the enterprise system (or other message originator) and the user, or users. In one embodiment, this message thread may be archived or made available to the enterprise system or outside systems.

In another embodiment, the Enterprise Mobile Notification System transmits message details and action keywords to the Enterprise Messaging gateway. The Enterprise Messaging gateway creates a unique URL for the message and sends to end user as WAP PUSH or SMS with URL. Such a message may read: "You have a new enterprise message from VRSN. Click Go: http://mobile.verisign.com/?id=XFGTxcg."

When the end user clicks on the link, he or she is taken to a WAP page hosted by the Enterprise Messaging Gateway. On that WAP page, the notification message body is shown. In one embodiment, the original SMS message may include such a WAP notification. The WAP page in on embodiment also includes action links. The end user can click on an Action link. When the end user selects an Action link, in one embodiment, an API call is made back to the Enterprise Mobile Notification System with appropriate NotificationID and Keyword.

In another embodiment, the message may include multiple URLs, corresponding to the response options. The user may then select one of the URLs, and this may be sufficient to make a selection. This would enable the selection of a URL which does not have any content, reducing the bandwidth usage and rendering time for the WAP page. This may be useful for devices which charge for the bandwidth used.

The Enterprise Messaging Gateway can pass the response to the Enterprise database. In one embodiment, the WAP Page is branded per the enterprise originating message. In one embodiment, a single Enterprise Messaging Gateway can service a plurality of corporations.

Figure 2:
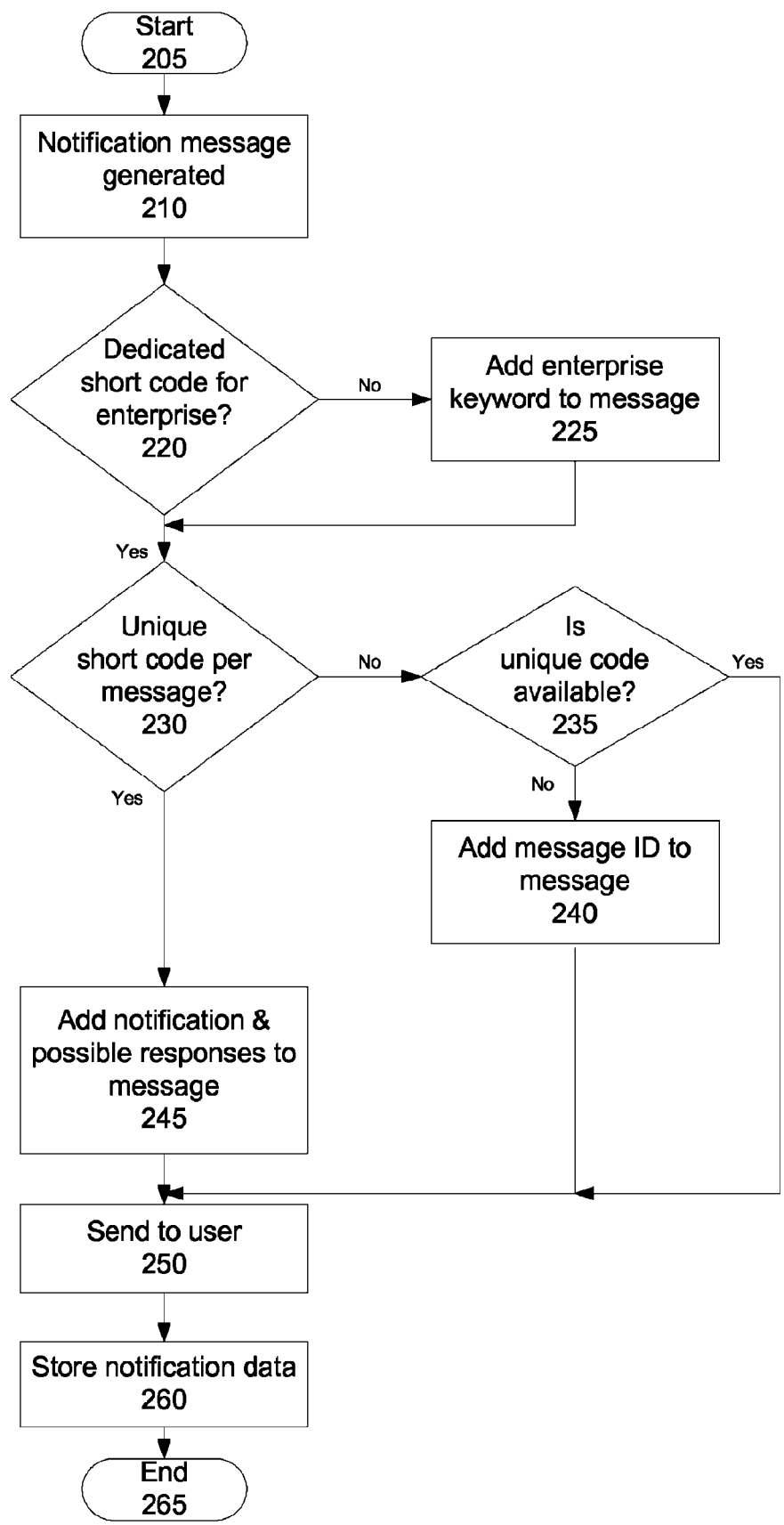
FIG. 2 is a flowchart of one embodiment of constructing a notification message.

FIG. 2 is a flowchart of one embodiment of the process. The process starts at block 210, when a notification message which needs a response is generated.

At block 220, the process determines whether the enterprise has a dedicated short code. If it does not, at block 225 an indication of the enterprise keyword which should be included with the response is added to the message.

At block 230, the process determines whether the system uses a set of rotating short codes. If so, at block 235, the process determines whether a short code is available for this message. If no short code is available for this message, the process at block 240 adds a message keyword to the message. This message keyword is to be returned by the SMS responder.

At block 245, the query is added to the SMS message, as are the possible responses. In one embodiment, possible responses are defined by the message originator. In one embodiment, they are automatically defined. In one embodiment, the default responses are agree/disagree/no decision. In one embodiment, the user may be provided with an appropriate abbreviation for each option, to minimize the required typing. Thus, the query may be: "Authorize Project Review? Respond with BU#2 MSG1234 (Y)es/(N)o." The user may respond with "BU#2 MSG1234 Y," if no dedicated short codes are available. If there are dedicated short codes the BU#2 and/or MSG1234 identifiers may be absent from the message. Thus, the response from the user may be as simple as "Y."

At block 250, the stateless message (SMS or otherwise) is sent to the user. In one embodiment, the message includes instructions. In one embodiment, if the message and instructions are too long to fit within the size limitations of SMS/other stateless messaging system, the message may be sent in two or more parts. At block 260, the system stores the short code associated with the message. If the short code is not unique for the message, the message ID is also stored. If the short code is also not unique for the enterprise, the enterprise keyword is also stored. The process then ends.

Figure 3:
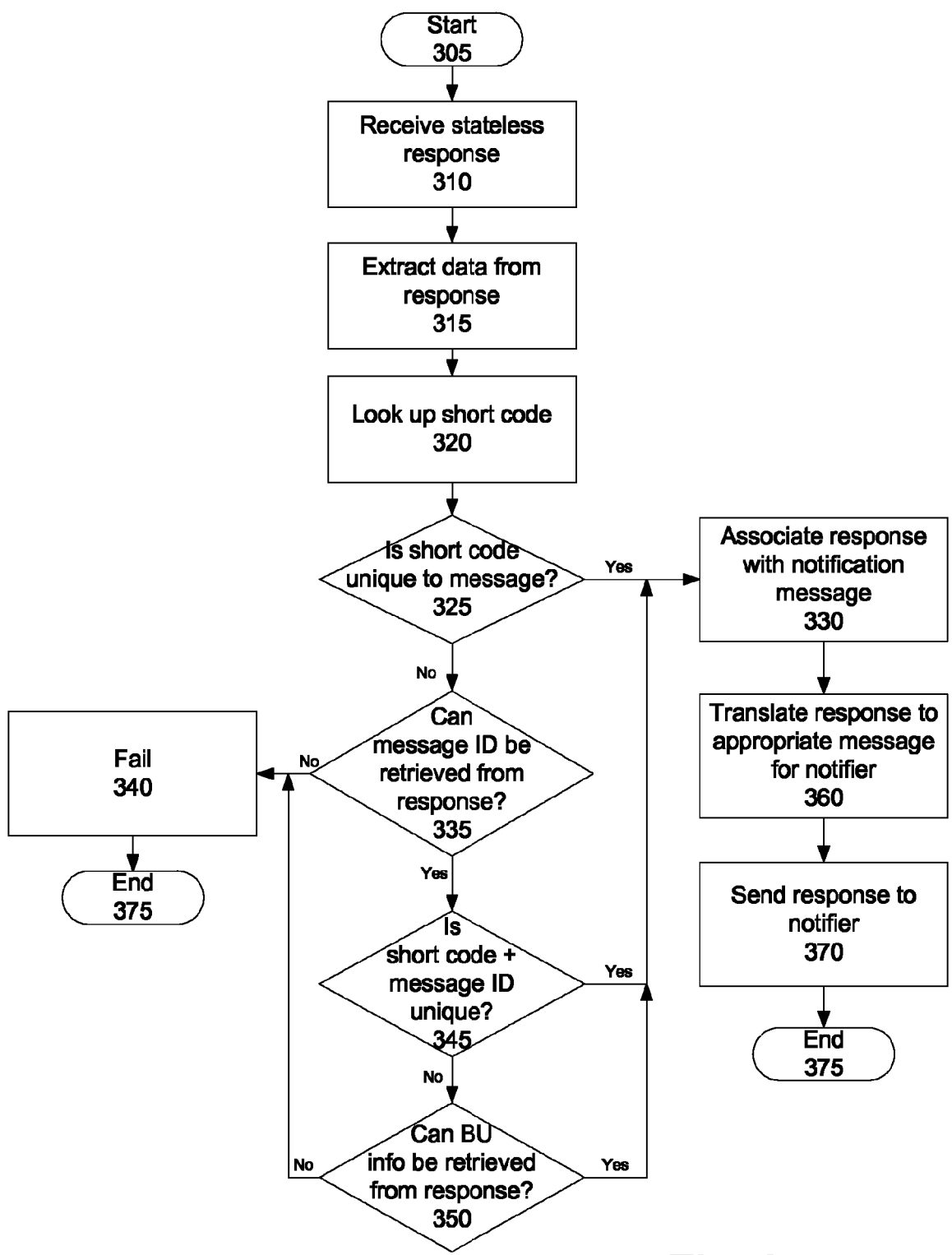
FIG. 3 is a flowchart of one embodiment of handling a response to the notification message.

FIG. 3 is a flowchart of one embodiment of handling a received response. As noted above, when the message is sent out, the system stores the short code associated with the message. If the short code is not unique for the message, the message ID is also stored. If the short code is also not unique for the enterprise, the enterprise keyword is also stored.

The process starts, at block 310, when a stateless response is received from a user.

At block 315, the available data is extracted from the stateless response from the user. The data that can be extracted from the response includes the short code to which it was sent, and its contents. It has no other referent for the originating message.

At block 320, the system looks up the short code. The short code may identify a particular message, a particular business unit, or a particular enterprise.

At block 325, the process determines whether the short code is unique to a particular message. If so, the received response is associated with the original notification message at block 330. In another embodiment, the entire enterprise may share a short code. In that case, this step may be skipped. If the short code is not unique to the message, the process continues to block 335.

At block 335, the process retrieves the message identification. If no message identification is found, the process fails at block 340. Otherwise, the process continues to block 345.

At block 345, the process determines whether the short code & message identification combination is unique to the organization. If it, then the received response is associated with the original notification at block 350. Otherwise, the process continues to block 350.

At block 350, the process attempts to retrieve the business unit information from the response. If the business unit information is not found, the process fails, at block 340. Otherwise, the received response is associated with the original notification at block 330.

Note that while in the above examples only two levels of identification were provided (message ID and business unit) the depth of identification may be increased or decreased, as appropriate. For example, a particular system may simply use unique message IDs, and thus obviate the need for business unit and/or enterprise identification. Another system may use a depth of four or more separate identifiers, for example message ID, work group, business unit, corporate entity, all of which exist under the same short message code. In this way, the system enables the use of stateless messaging, such as the messaging provided by short messaging system (SMS), multimedia messaging system (MMS), or universal resource locators (URL) to provide state-linked responses to queries.

Once the response is associated with the notification message, at block 330, the process continues to block 360. At block 360, the response is translated to the appropriate language and/or format for the original notification generator. This format change may include everything from changing a "Y" to an "Approved" or similar language shift, or the change of a text message into HTML, a programming language, a spreadsheet format, etc.

At block 370, the response is sent to the logic which generated the original notification. The system sends this response using the conventional path of the notification generator. Therefore, the enterprise system which generates notifications need not be modified in any way to enable it to use SMS as a path for notifications. By intercepting messages as they are generated, and translating them into the appropriate stateless notification message, and re-translating upon a response, existing enterprise systems can be utilized with new notification technologies. In one embodiment, the system intercepts messages generated by the notification system, and forwards them on, after generating a copy for use in the stateless messaging system. This ensures that complete records are available. In one embodiment, the entire exchange is stored in the system, to enable review of actions which occurred. In one embodiment, the system may further generate an acknowledgement message to the user.

Note that while the above example discussed an enterprise messaging system, the invention described herein has applicability in other circumstances. Any system which includes an initial message to which a response is requested. Furthermore, while SMS was described in detail, the messaging platform may be any stateless messaging system.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of creating associations between messages in a stateless system, the method comprising:
receiving a notification message by an enterprise mobile notification server from an enterprise system;
adding, by the enterprise mobile notification server, a plurality of action keywords to the notification message, wherein a user can select one of the plurality of action keywords in the notification;
storing a plurality of available short codes associated with the enterprise system in memory in the enterprise mobile notification server;

adding, by the enterprise mobile notification server, a unique identification to the notification message being sent to the stateless client device, wherein the unique identification comprises a unique short code, selected from among the plurality of available short codes stored in the memory, the short code selected to minimize possibility of conflict;

sending, by the enterprise mobile notification server, the notification message including the unique identification to the stateless client device;

upon receiving, by the enterprise mobile notification server, a response from the stateless client device, identifying the unique identification within the response, and utilizing the unique identification to associate the response with the notification message, wherein the response comprises a selection of one of the plurality of action keywords;

translating, by the enterprise mobile notification server, the selection of one of the plurality of action keywords to a response for the enterprise system; and sending, by the enterprise mobile notification server, the translated response to the enterprise system which generated the notification message.

2. The method of claim 1, wherein the unique identification further comprises a NotificationID assigned to the message, and wherein the NotificationID is manually entered by the user in the response.

3. The method of claim 1, wherein the unique identification further comprises an enterprise keyword in combination with a short code, the short code being a shared short code.

4. The method of claim 1, further comprising:
translating a notification into an appropriate format for the stateless system.

5. The method of claim 1, wherein the stateless system comprises short messaging system (SMS) messaging.

6. A server comprising:
memory to store a plurality of available short codes associated with an enterprise;
a enterprise mobile notification system (EMNS) to receive a notification message from an enterprise system, to add a plurality of action keywords to the notification message, wherein a user can select one of the plurality of action keywords in the notification message, to translate the selection of one of the plurality of action keywords to a response for the enterprise system, to send the notification message to a messaging gateway, and to transmit a translated response to the enterprise system and
a messaging gateway to add a unique identification to the notification message, wherein the unique identification comprises a unique short code, selected from among the plurality of available short codes stored in the memory, the short code selected to minimize possibility of conflict, to send the notification message including the unique identification to a stateless client device, and upon receiving a response from a user that comprises a selection of one of the plurality of action keywords, to identify the unique identification within the response, to utilize the unique identification to associate the response with the notification message, to send the response to the enterprise mobile notification system.

7. A method comprising:
storing a plurality of available short codes associated with an enterprise in memory in a server;
intercepting, by the server, a notification from an enterprise system;
generating, by the server, an SMS message based on the notification, the SMS message including a plurality of action keywords, wherein a user can select one of the plurality of action keywords in the SMS message, and a unique identification, to enable the stateless SMS message to be associated with the notification, wherein the unique identification comprises a unique short code, selected from among the plurality of available short codes stored in the memory, the short code selected to minimize possibility of conflict;
receiving, by the server, a response to the SMS message, wherein the response comprises a selection of one of the plurality of action keywords;
associating, by the server, the response with the notification based on the unique identification;
translating the selection of one of the plurality of action keywords to a response for an enterprise system which generated the notification message; and
sending, by the server, the translated response to the enterprise system.

8. The method of claim 7, further comprising:
translating the notification message to optimize for delivery via SMS.

9. The method of claim 7, wherein the notification is a from an enterprise messaging system.

10. The server of claim 6, wherein the unique identification is further comprises a NotificationID assigned to the message, and wherein the NotificationID is manually entered by the user in the response.

11. The server of claim 6, wherein the unique identification further comprises an enterprise keyword in combination with a short code, the short code being a shared short code.

12. The server of claim 6, wherein the unique identification further comprises a NotificationID assigned to the message, and wherein the NotificationID is manually entered by the user in the response.

13. The server of claim 6, wherein the unique identification further comprises an enterprise keyword in combination with a short code, the short code being a shared short code.

14. The server of claim 6, further comprising:
the messaging gateway further to translate the notification into an appropriate format for the stateless system.

15. The server of claim 6, wherein the stateless system comprises short messaging system (SMS) messaging.

* * * * *